US010866757B2

(12) United States Patent
Bhanushali et al.

(10) Patent No.: US 10,866,757 B2
(45) Date of Patent: Dec. 15, 2020

(54) SYSTEM AND METHOD FOR PROVIDING BACKUP SERVICES TO HIGH AVAILABILITY APPLICATIONS

(71) Applicant: EMC IP Holding Company LLC, Hopkinton, MA (US)

(72) Inventors: Jigar Premajibhai Bhanushali, Bangalore (IN); Sunil Yadav, Bangalore (IN); Aneesh Kumar Gurindapalli, Bangalore (IN); Sunder Ramesh Andra, Bangalore (IN); Amarendra Behera, Varthur (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 136 days.

(21) Appl. No.: 16/143,353

(22) Filed: Sep. 26, 2018

(65) Prior Publication Data

US 2020/0097178 A1 Mar. 26, 2020

(51) Int. Cl.
*G06F 3/06* (2006.01)
(52) U.S. Cl.
CPC ............. *G06F 3/065* (2013.01); *G06F 3/067* (2013.01); *G06F 3/0619* (2013.01)
(58) Field of Classification Search
CPC ........ G06F 3/0619; G06F 3/065; G06F 3/067; G06F 11/1446; G06F 11/1471;
(Continued)

(56) References Cited

U.S. PATENT DOCUMENTS 7,685,227 B2 *  3/2010  Gerber ................ G06F 11/2033
                                                          709/201
9,485,323 B1 * 11/2016  Stickle .................... H04L 67/02
(Continued)

OTHER PUBLICATIONS

"Overview of Always on Availability Groups (SQL Server)"; Microsoft Docs; May 16, 2016; https://docs.microsoft.com/en-us/sql/database-engine/availability-groups/windows/overview-of-always-on-availability-groups-sql-server.

(Continued)

*Primary Examiner* — Sanjiv Shah
*Assistant Examiner* — Edward Waddy, Jr.
(74) *Attorney, Agent, or Firm* — Chamberlain, Hrdlicka, White, Williams & Aughtry

(57) ABSTRACT

A production host for hosting a multi-instanced application includes a persistent storage and a resource manager. The persistent storage stores a resource registration associated with a plurality of instances of the multi-instanced application and a resource backup registration associated with backups, of the multi-instance application, that are stored in backup storage. The resource manager obtains a backup generation request for the multi-instanced application; in response to obtaining the backup generation request: makes a first determination that the resource registration does not match the production host; in response to the first determination: forwards the backup generation request to an entity that matches the resource registration; performs a backup generation for the application to obtain continuity chain information associated with the multi-instanced application; and modifies a continuity chain associated with the multi-instanced application based on the continuity chain information to update the resource backup registration.

20 Claims, 13 Drawing Sheets

(58) Field of Classification Search
CPC .............. G06F 11/3664; G06F 11/368; G06F 11/3688; G06F 11/006; G06F 11/302; G06F 11/327; G06F 11/3409; G06F 11/3419; G06F 11/3442; G06F 11/3452
USPC ................................................ 711/162, 171
See application file for complete search history.

(56) References Cited

U.S. PATENT DOCUMENTS

| | | | |
|---|---|---|---|
| 9,934,107 B1 | | 4/2018 | Chikkanayakanahally et al. |
| 10,572,294 B1 | * | 2/2020 | Chawda .............. G06F 9/44521 |
| 2009/0158020 A1 | * | 6/2009 | Chen .................. G06F 11/1469 713/2 |
| 2009/0248759 A1 | * | 10/2009 | Okada ................. G06F 11/1458 |
| 2014/0074790 A1 | | 3/2014 | Berman et al. |
| 2017/0048135 A1 | * | 2/2017 | Fukui ..................... H04L 45/22 |
| 2018/0285353 A1 | * | 10/2018 | Ramohalli Gopala Rao .............. G06F 16/27 |
| 2020/0036694 A1 | * | 1/2020 | Mills ....................... H04L 63/08 |

OTHER PUBLICATIONS

"Microsoft SQL Server AlwaysOn Solutions Guide for High Availability and Disaster Recovery"; Microsoft SQL Server AlwaysOn Solutions Guide for High Availability and Disaster Recovery; Jan. 2012.

Extended European Search Report issued in corresponding European Application No. 19196658.9, dated Feb. 27, 2020.

* cited by examiner

SYSTEM AND METHOD FOR PROVIDING BACKUP SERVICES TO HIGH AVAILABILITY APPLICATIONS

BACKGROUND

Computing devices may store information. The information may reflect information entered by a user. Thus, the information may be important to a user.

For example, a user may type information into a database, may add data to a spreadsheet, or may draft emails. Each of these interactions between a user and a community device may cause information important to a user to be stored in a computing device.

SUMMARY

In one aspect, a production host for hosting a multi-instanced application in accordance with one or more embodiments of the invention includes a persistent storage and a resource manager. The persistent storage stores a resource registration associated with a plurality of instances of the multi-instanced application and a resource backup registration associated with backups, of the multi-instance application, that are stored in backup storage. The resource manager obtains a backup generation request for the multi-instanced application; in response to obtaining the backup generation request: makes a first determination that the resource registration does not match the production host; in response to the first determination: forwards the backup generation request to an entity that matches the resource registration; performs a backup generation for the application to obtain continuity chain information associated with the multi-instanced application; and modifies a continuity chain associated with the multi-instanced application based on the continuity chain information to update the resource backup registration.

In one aspect, a method for managing a multi-instanced application in accordance with one or more embodiments of the invention includes obtaining a backup generation request for the multi-instanced application; in response to obtaining the backup generation request: making a first determination that a resource registration does not match the production host, where the resource registration is associated with a plurality of instances of the multi-instanced application; in response to the first determination: forwarding the backup generation request to an entity that matches the resource registration; performing a backup generation for the application to obtain continuity chain information associated with the multi-instanced application; and modifying a continuity chain associated with the multi-instanced application based on the continuity chain information to update a resource backup registration. The resource backup registration is associated with backups, of the multi-instance application, that are stored in backup storage.

In one aspect, a non-transitory computer readable medium in accordance with one or more embodiments of the invention includes computer readable program code, which when executed by a computer processor enables the computer processor to perform a method for managing a multi-instanced application. The method includes obtaining a backup generation request for the multi-instanced application; in response to obtaining the backup generation request: making a first determination that a resource registration does not match the production host, where the resource registration is associated with a plurality of instances of the multi-instanced application; in response to the first determination: forwarding the backup generation request to an entity that matches the resource registration; performing a backup generation for the application to obtain continuity chain information associated with the multi-instanced application; and modifying a continuity chain associated with the multi-instanced application based on the continuity chain information to update a resource backup registration. The resource backup registration is associated with backups, of the multi-instance application, that are stored in backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing virtual machines in a multi-aliased environment. More specifically, embodiments of the invention provide a framework for registering multi-aliased virtual machines and ensuring that backup generations are serviced by appropriate production hosts.

In one or more embodiments of the invention, the system registers one alias of a multi-aliased virtual machine prior to generating backups. When backup generation requests are received by an alias of the multi-aliased virtual machine, the virtual machines may verify whether they need a primary alias to generate the backup rather than a secondary alias. In a scenario where a different alias is required than that which received the backup generation request, the virtual machine may forward the request in response to receiving the request. In this manner, embodiments of the invention enable multi-aliased virtual machines to be properly serviced for backup generation purposes.

Figure 1:
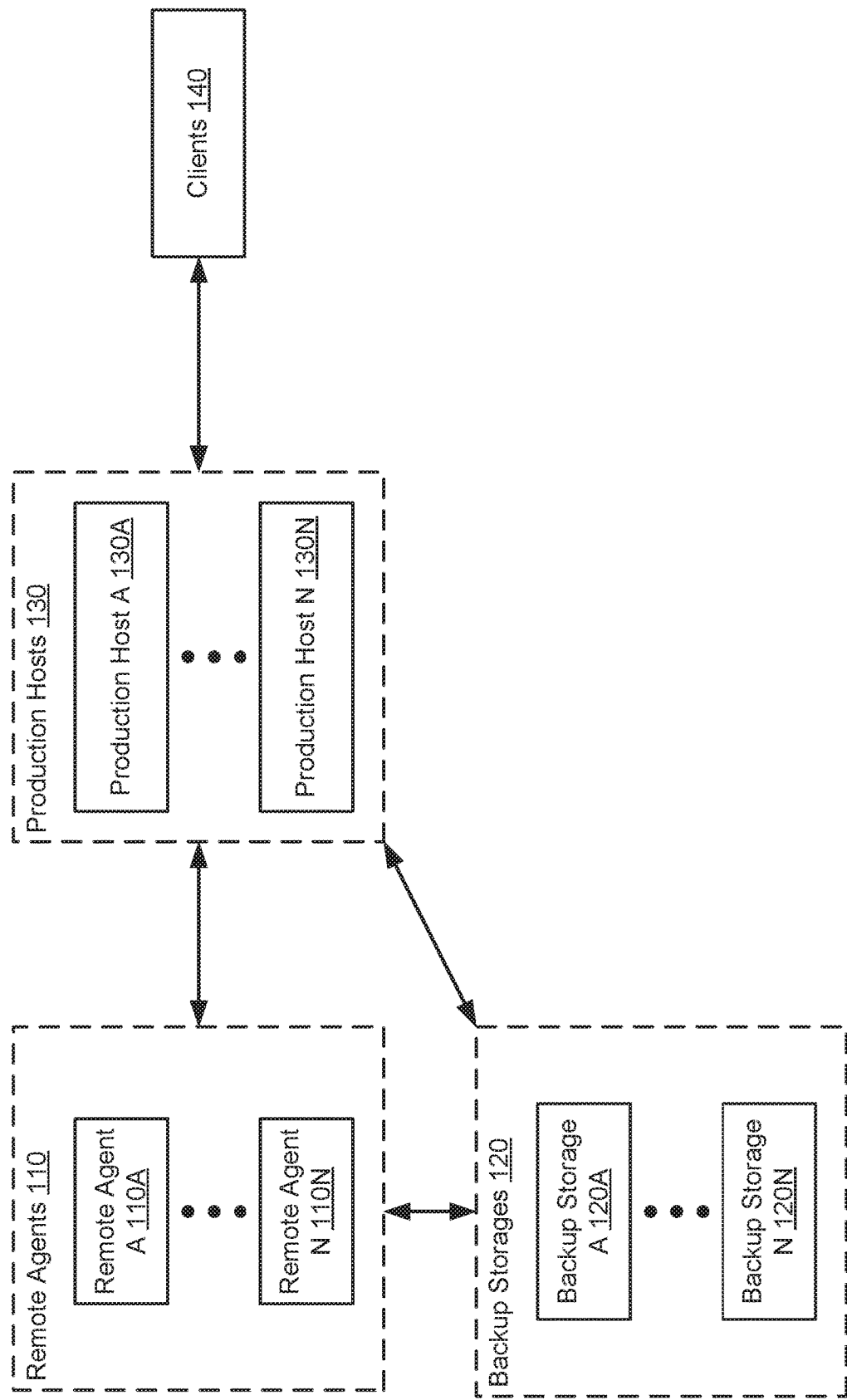
FIG. 1 shows a diagram of a system in accordance with one or more embodiments of the invention.

FIG. 1 shows an example system in accordance with one or more embodiments of the invention. The system may include clients (140) that obtain services from virtual machines hosted by production hosts (130). One or more of the virtual machines may be multi-aliased. That is, multiple instances of a virtual machine may be executing with only one of the instances being designated for both read and write purposes, the remaining instances may be designated only for read purposes. Different numbers of virtual machines may be designated for read and write purposes without departing from the invention. For additional details regarding production hosts, see e.g., FIG. 2A. For additional details regarding virtual machines, see e.g., FIGS. 2B-2C.

Figure 4A:
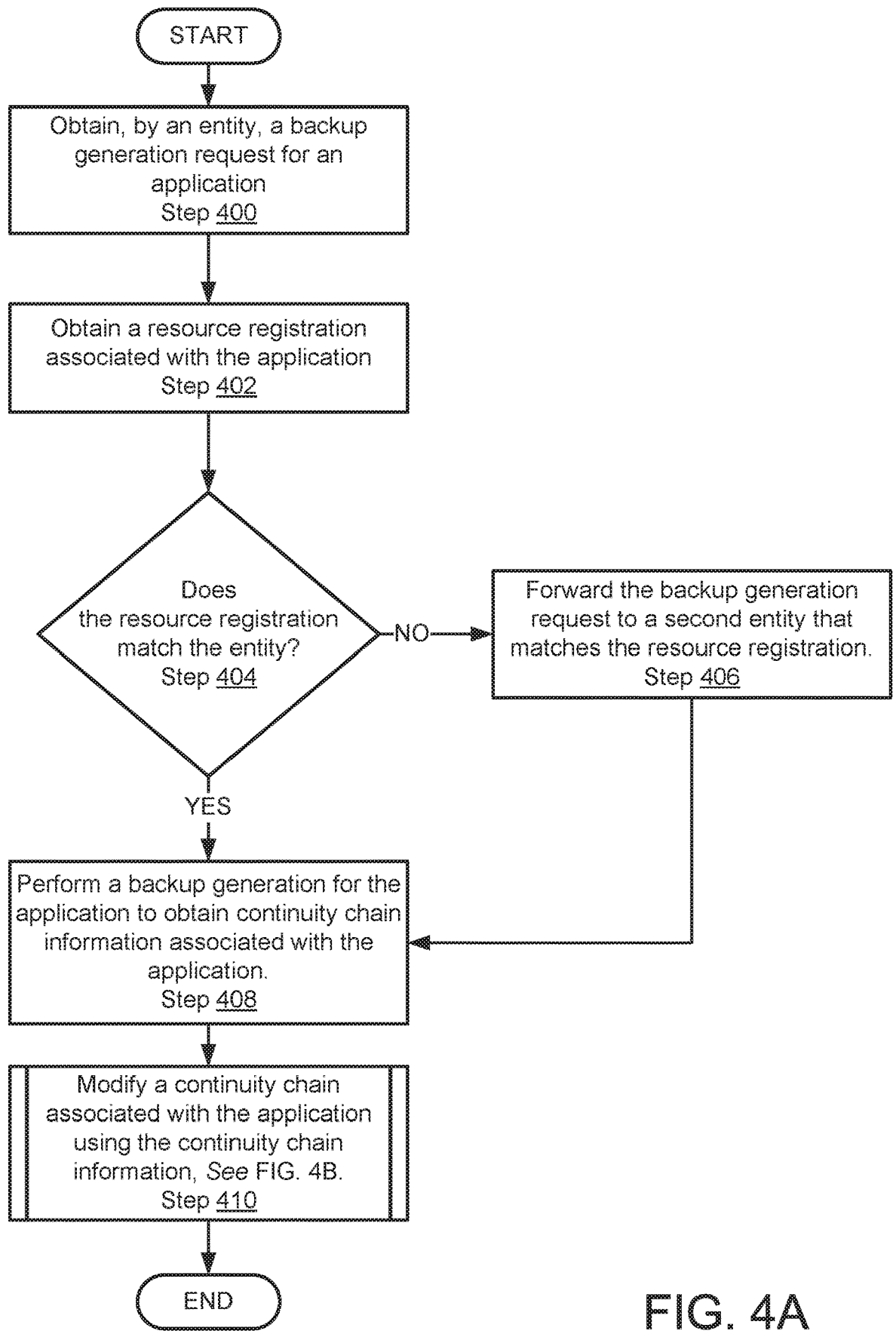
FIG. 4A shows a flowchart of a method of generating a backup for a virtual machine in accordance with one or more embodiments of the invention.

The remote agents (110) may orchestrate the generation and storage of backups of the virtual machines in backup storage (120). The remote agents (110) may generate backups by performing the methods illustrated in FIGS. 4A-5. An example of managing multi-aliased virtual machines, including generating backups, in accordance with the methods of FIGS. 4A-5 is illustrated in FIGS. 6A-6E.

The remote agents (110) may utilize listeners that specify the aliases of a multi-aliased virtual machine when generating a backup for such a virtual machine. For additional details regarding listeners, see e.g., FIG. 3B. For additional details regarding remote agents, see e.g., FIG. 3A.

Each component of the system of FIG. 1 may be operably connected via any combination of wired and wireless connections. Each component of the system of FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, see e.g., FIG. 7.

The clients (140) may interact with applications hosted by the production hosts (130). For example, the applications may be databases, email servers, or any other type of application. The clients (140) may utilize services provided by these examples of applications or other application types hosted by the production hosts (130). By utilizing the services of the applications, data that is important to the clients (140) may be stored as part of application data for each respective application on the production hosts (130) or at other locations.

For example, a production host may host an email application. One of the clients may utilize the services of the email application by receiving and sending emails via the email application. Copies of the client's emails may be stored as part of the email application data. By doing so the email application may host data in the form of emails that are important to the client.

In one or more embodiments of the invention, the applications are hosted by virtual machines. The virtual machines may be hosted by the production hosts. In this manner, different clients may be provided different services by different virtual machines which are in turn hosted by different production hosts.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and all, or a portion thereof, of the methods illustrated in FIGS. 4A-5. The production hosts (130) may be other types of computing devices without departing from the invention. For additional details regarding computing devices, see e.g., FIG. 7.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across any number of separate and/or distinct computing devices. In such a scenario, the functionality of the production hosts (130) may be performed by multiple different computing devices without departing from the invention.

In one or more embodiments of the invention, the production hosts (130) host virtual machines. Each of the virtual machines may host any number of applications. Applications may provide services to the clients, or any other entity. As will be discussed in greater detail with respect to FIGS. 2B-2C, any number of virtual machines may host any number of instances of a single type of application. When clients request to have services provided by a single type of application the client load made to be distributed across any number of instances. For additional details regarding the production hosts (130), see e.g., FIG. 2A.

In one or more embodiments of the invention, the remote agents (110) are computing devices. A computing device may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 4A-5. The remote agent (110) may be other types of computing devices without departing from the invention. For additional details regarding computing devices, see e.g., FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agent (110) may be distributed devices that include components distributed across any number of separate and/or distinct computing devices. In such a scenario, the functionality of the remote agent (110) may be performed by multiple different computing devices without departing from the invention.

In one or more embodiments of the invention, the remote agents (110) manage the provision of services from applications hosted by the production hosts to clients or other entities. To manage the provision of services, the remote agents may keep track of the number of instances and location of each instance of each application hosted by the production hosts. To do so, the remote agents may use data structures, referred to as listeners (not shown), that specify all of the instances of a particular application.

In one or more embodiments of the invention, the remote agents provide backup and restoration services to the virtual machines hosted by the production hosts. To provide backup services to the virtual machines the remote agents may store data from the virtual machines and backup storage. To provide restoration services to the virtual machines the remote agents may obtain previously stored data from backup storage and use the obtained data to restore a virtual machine to a previous state.

Similarly, the remote agents may provide backup and restoration services to applications at a granular level. For example, the remote agents may generate backups of databases hosted by the virtual machines. To do so remote agents may obtain data from the databases and store the data in backup storage. The data may be, for example, copies of portions of the database, incremental rights to the database over a predetermined period of time, or other data used to restore the database to a previous state.

In one or more embodiments of the invention, the remote agents select a single instance of a virtual machine or an application for backup generation purposes. In other words, only a single virtual machine or application is backed up. Similarly, the backup data associated with that single virtual machine or application stored in backup storage is used for restoring any of the instances of a particular application or virtual machine.

As will be discussed in greater detail below, the production hosts may cooperate during backup generation to ensure that a proper instance of an application or virtual machine that has both read and write out privileges is used for backup generation purposes. By doing so embodiments of the invention may automatically correct for improper instance selection by remote agents. In turn, the reliability of the system for data integrity purposes is improved by eliminating a potential point backup generation failure. In other words, a distributed system in accordance with embodiments of the invention may automatically correct inter-device level errors in backup generation. For additional details regarding the remote agent (110), see e.g., FIGS. 3A-3B.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIGS. 4A-4B. For additional details regarding computing devices, see e.g., FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across any number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, application data. Any quantity of application data may be stored in the backup storages (120) without departing from the invention. The application data may be associated with respective applications from which the application data was obtained. In a scenario in which multiple instances of an application or executing, application data may be associated with all of the instances of the application. In other words, a single backup may be used to restore any number of instances of an application.

In one or more embodiments of the invention, the backup storages (120) may deduplicate the application data against existing data stored in the backup storages. By deduplicating the application data, the quantity of data that it can stored in the backup storages may be increased when compared to storing the application without deduplication. To deduplicate the application, the backup storages (120) may only storing copies of unique portions of the application data. When storing the application data, the application data may first be checked to determine whether it is duplicative of data already stored in the backup storage. Only the unique portions of the application data may be stored in the backup storage. Storing and accessing deduplicated application data may be significantly more computing resource costly than storing application data that is not deduplicated.

Figure 2A:
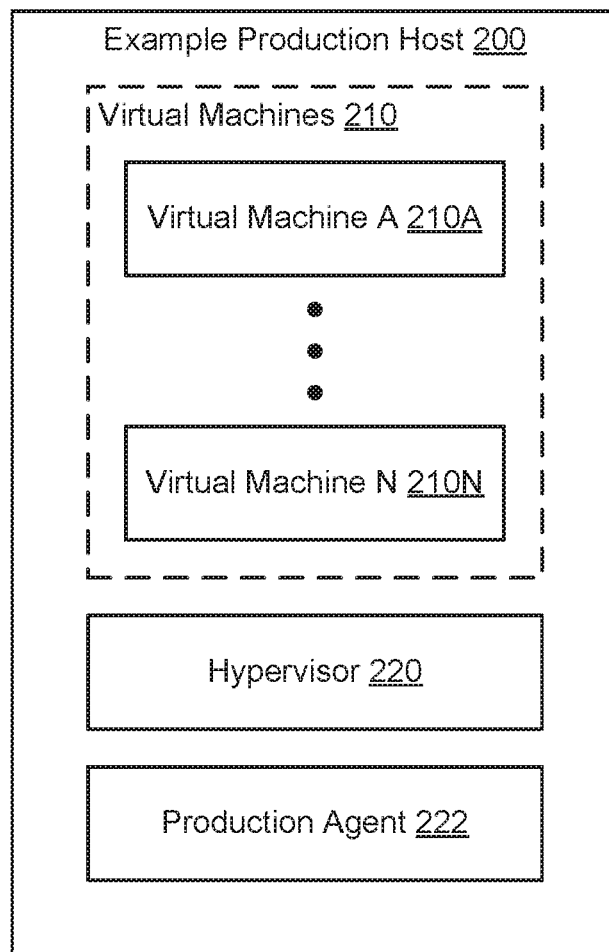
FIG. 2A shows a diagram of an example production host in accordance with one or more embodiments of the invention.

As discussed above, the backup storages may store data obtained from the production hosts (130). FIG. 2A shows a diagram of an example production host (200) in accordance with one or more embodiments of the invention.

In one or more embodiments of the invention, the example production host (200) hosts virtual machines (210). The virtual machines (210) may host any number of applications as will be described in greater detail with respect to FIG. 2B. Each of the virtual machines (210A, 210N) may host similar or different applications without departing from the invention.

In one or more embodiments of the invention, the example production host (200) includes a hypervisor (220). The hypervisor (220) may allocate computing resources to the virtual machines (210). For example, the hypervisor (220) may dedicate processor cycles, memory space, and storage space for use by the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

In one or more embodiments of the invention, the example production host (200) includes a production agent (222). The production host (222) may orchestrate the generation of backups of entities hosted by the example production host. For example, the production agent may orchestrate the generation of backups of the virtual machines or applications hosted by the virtual machines. When orchestrating the generation of backups, production agent may perform all or a part of the methods illustrated in FIGS. 4A-5.

In one or more embodiments of the invention, the production agent (222) is a hardware device including circuitry. The production agent (222) may be, for example, a digital signal processor, a field programmable gate array, or an application specific integrated circuit. The production agent (222) may be other types of hardware devices without departing from the invention.

In one or more embodiments of the invention, the production agent (222) is implemented as computing code stored on a persistent storage that when executed by a processor performs the functionality of the production agent (222). The processor may be a hardware processor including circuitry such as, for example, a central processing unit or a microcontroller. The processor may be other types of hardware devices for processing digital information without departing from the invention.

Figure 2B:
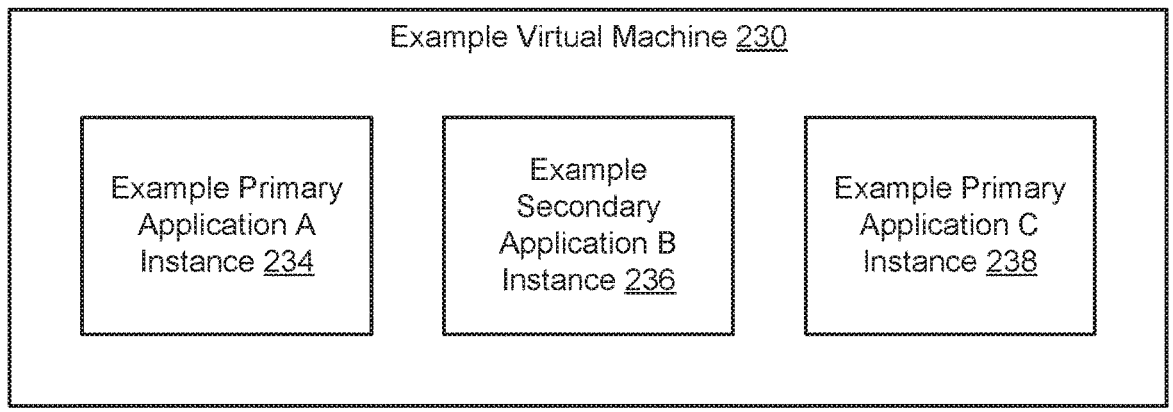
FIG. 2B shows a diagram of a virtual machine in accordance with one or more embodiments of the invention.

As discussed above, virtual machines may host any number of applications. FIG. 2B shows a diagram of an example virtual machine (230). The example virtual machine hosts three applications: an example primary application A instance (234), an example secondary application B instance (236), and example primary application C instance (238). In this example, the example virtual machine hosts two primary application instances that have both read and write access. In other, words the primary application instances may be both read from (i.e., service read requests) and written to (i.e., service write requests). In contrast, the secondary application instance may only be read from (i.e., service write requests).

In one or more embodiments of the invention, only a single instance of multiple instances of an application has both read and write access. By enforcing this limitation, consistency between instances of the application may be achieved using very limited computing resources. In contrast, it is computationally expensive to enforce consistency across multiple instances of an application that each have write access.

In one or more embodiments of the invention, consistency across instances of an application means that all of the instances have similar data, or identical data. For example, multiple instances of a database may be consistent if each instance of the database includes the same data. In a scenario in which only one of the instances has write access, consistency across all of the instances may be achieved by monitoring the modification of data in the instance having write access and mirroring those modifications to the data of the other instances.

In one or more embodiments of the invention, data consistency across instances of an application reduces the computing resource cost of backing up all of the instances. For example, a single backup of any instance may be used to restore any other instance. In this manner, a 1 to N relationship between backups and instances may be established on a per application basis.

Figure 2C:
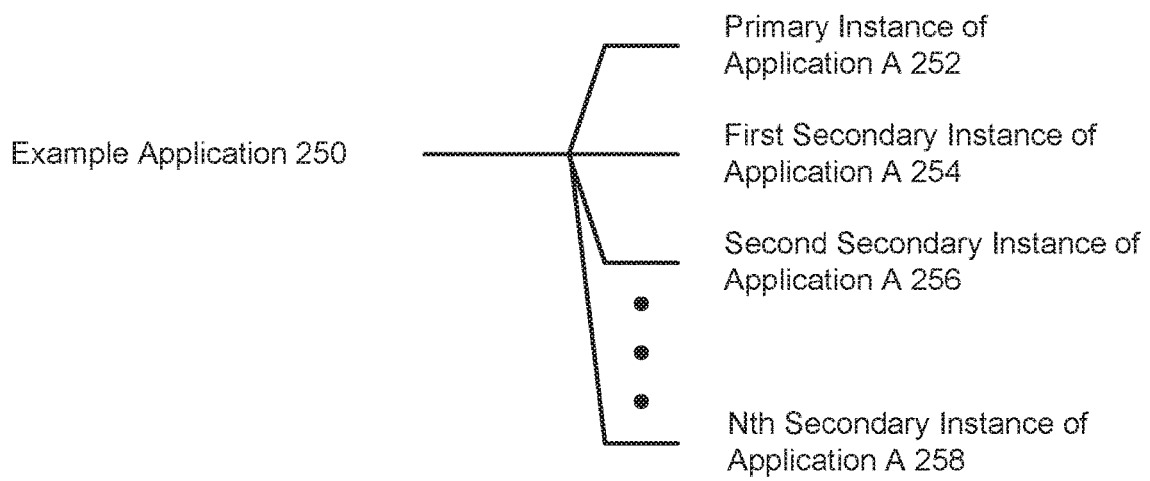
FIG. 2C shows a relationship diagram in accordance with one or more embodiments of the invention.

To further clarify the relationship between primary and secondary sentences of an application, FIG. 2C shows a relationship diagram. In the relationship diagram, an example application (250) is associated with a single primary instance of the example application (252). The example application (250) is also associated with a first secondary instance of the example application (254), a second secondary instance of the example application (256), and any number of other instances up to an Nth secondary instance of the example application (258).

As seen from the relationship diagram, there is a one to N relationship between the example application and the secondary instances. In contrast, there is a one to one relationship between the example application in the primary instance. The primary instance may be associated with both read and write access that modifications to the primary instance may be made as necessary. In contrast, all of the secondary instances may be associated with only read access which, consequently, prevents modifications to the secondary instances from being made via client request. In this scenario, the secondary instances may be useful for providing services to clients by serving data. By generating multiple of the secondary instances, the number of clients that may be served concurrently may be increased when compared to the number of clients that may be served concurrently when only a single instance is available.

Figure 3A:
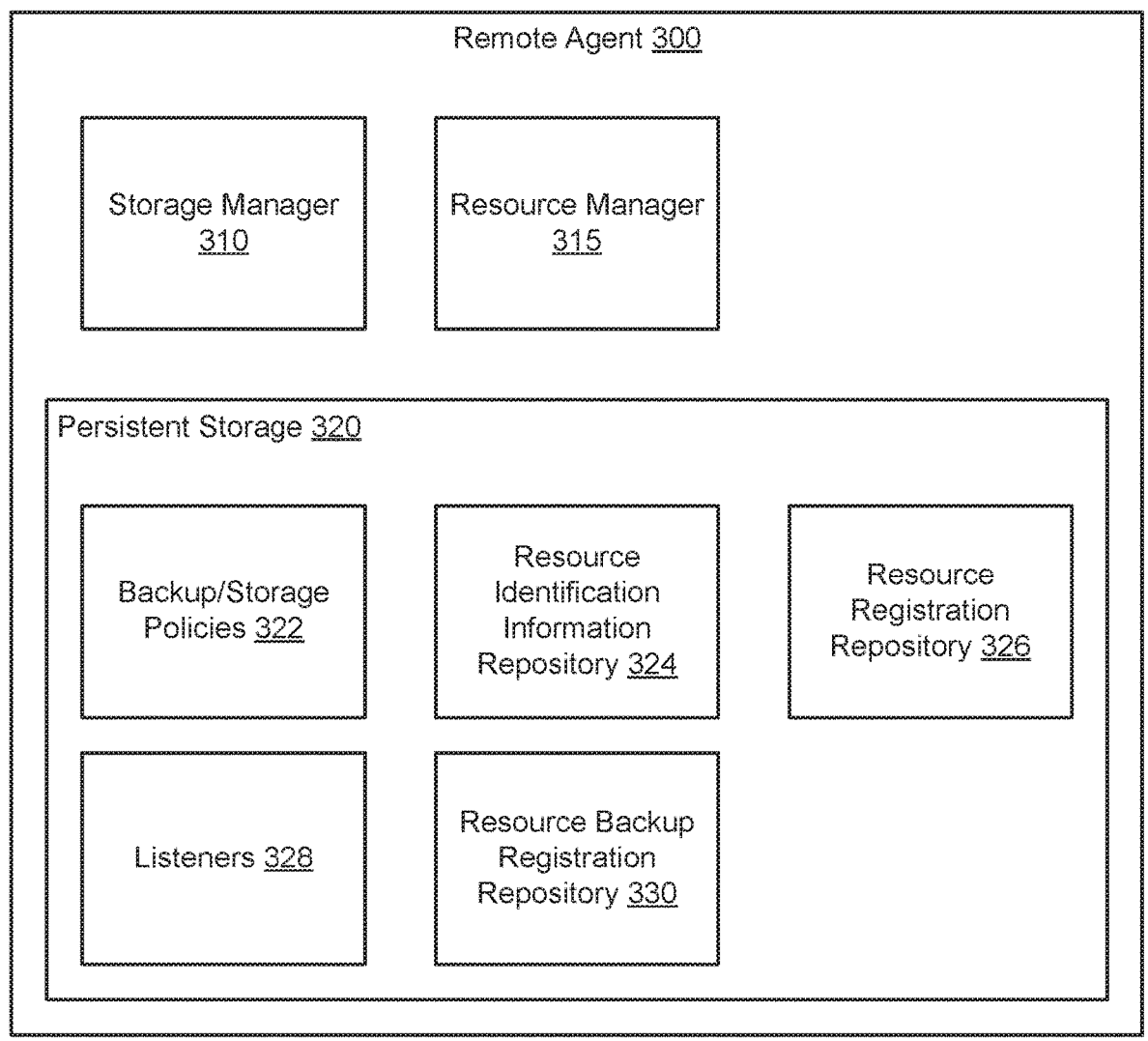
FIG. 3A shows a diagram of an example remote agent in accordance with one or more embodiments of the invention.

As discussed above, the remote agents may orchestrate storage of production host data in backup storage. FIG. 3A shows a diagram of an example remote agent (300) in accordance with one or more embodiments of the invention.

In one or more embodiments of the invention, the example remote agent (300) orchestrates the storage of data from the production hosts in backup storage. Similarly, the example remote agent (300) may orchestrate the restoration of the production hosts using data stored in the backup storage.

In one or more embodiments of the invention, the example remote agent (300) identifies resources of the production hosts for storage purposes. In a scenario in which a resource is multi-instanced, i.e., includes at least one primary and one secondary instance, the example remote agent (300) may be configured to only generate a backup of one of the instances of the multi-instanced resource.

For example, consider a scenario in which three instances of the database are hosted by three separate virtual machines. Prior to the generation of the database instances, the example remote agent (300) may identify the existence of the multiple instances and take action to ensure that only a backup of one of the instances is generated whenever a backup of any of the instances is requested. In this manner, embodiments of the invention may improve the consistency of backup generation across multi-instanced resources.

To provide the aforementioned functionality, the example remote agent (300) includes a storage manager (310), a resource manager (315), and a persistent storage (320). Each component of the example remote agent (300) as discussed below.

In one or more embodiments of the invention, the storage manager (310) orchestrates generation of backups and performance of restorations, as discussed above. To provide the aforementioned functionality, the backup manager (310) may perform all, or a portion, of the methods illustrated in FIGS. 4A-5.

When generating backups and/or performing restorations, the storage manager (310) may utilize data structures stored in the persistent storage (320). Specifically, the storage manager may utilize backup storage policies (322), a resource registration repository (326), and a resource backup registration repository (330). Each of these data structures may be generated by the resource manager (315).

In one or more embodiments of the invention, the storage manager (310) is a hardware device including circuitry. The storage manager (310) may be, for example, a digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be a hardware processor including circuitry such as, for example, a central processing unit or a microcontroller. The processor may be other types of hardware devices for processing digital information without departing from the invention.

In one or more embodiments of the invention, the resource manager (315) manages resources of the production hosts for providing services to clients. Specifically, resource manager (315) assigned instances of applications to provide services to clients. To do so, the resource manager (315) may obtain resource identification information from the resources of the production hosts. For multi-instanced applications, or other multi-instanced resources, the resource manager (315) may generate listeners (328).

In one or more embodiments of the invention, a listener is a data structure that specifies relationships between an entity and its instances. For example, a listener may specify relationships as set forth in FIG. 2C. The resource manager (315) may use listeners to assign instances to serve client requests based on the content of the client requests.

For example, if a client request for services only requires read access to application data, a secondary instance may be assigned to service request. In contrast, if a client's requests require write access to application data, the primary instance may be assigned to service the client requests.

However, as will be discussed below, listeners may be problematic for backup and restoration purposes. Because of the non-unique relationship between an application and its multiple instances, it may be difficult to identify which of the instances should be used for backup purposes. One or more embodiments of the invention may address this problem by establishing a relationship between an application and a single one of its instances for backup purposes. For additional details regarding listeners (328), see e.g., FIG. 3B.

In one or more embodiments of the invention, the resource manager (315) generates the resource registration repository (326) based on the resource identification information stored in a repository (324). Specifically, the resource manager generates unique relationships between each application and a single instance of the application. These relationships may be stored in the resource registration repository (326) and used for backup generation purposes. For multi-instanced applications or other entities, the relationship may specify one of the instances of the multi-instanced application for backup generation purposes. In contrast, the relationship may specify the only instance of a single-instanced application.

In one or more embodiments of the invention, the resource manager (315) is a hardware device including circuitry. The resource manager (315) may be, for example, a digital signal processor, a field programmable gate array, or an application specific integrated circuit. The resource manager (315) may be other types of hardware devices without departing from the invention.

In one or more embodiments of the invention, the resource manager (315) is implemented as computing code stored on a persistent storage that when executed by a processor performs the functionality of the resource manager (315). The processor may be a hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or logical device. For example, the persistent storage (320) may include solid state drives, solid state drives, tape drives, and other components to provide data storage functionality. Alternatively, the persistent storage (320) may be a logical device that utilizes the physical computing resources of other components to provide data storage functionality.

In one or more embodiments of the invention, the persistent storage (320) stores backup/storage policies (322), the resource identification information repository (324), a resource registration repository (326), listeners (328), and resource backup registration repository (330). Each of these data structures as discussed below.

In one more embodiments of the invention, the backup/storage policies (322) include information that governs the backup and storage of data from the production hosts. For example, the backup/storage policies (322) include any number of policies that govern the storage of data from the production hosts and backup storage. Similar policies may be included that govern performance restorations of virtual machines, applications, or other entities.

A backup policy may, for example, specify when and/or how data for the production hosts is stored in backup storage. The backup policy may specify, for example, that data is to be stored in backup storage periodically, on the occurrence of an event, or in response to other trigger conditions. The backup policy may specify, for example, where the data is to be stored, a level of redundancy of the stored data, retention duration of the stored data, a security level of the stored data, and/or other characteristics of the process of storing backup data in backup storage.

In one or more embodiments of the invention, the resource identification information repository (324) includes information regarding all of the resources, or portion thereof, of the production hosts. For example, the resource identification information repository (324) may include identifiers of each application executing using resources of the production hosts. For multi-instanced applications, the resource identification information repository (324) may include an identifier of each instance and/or a designation of whether each instance is a primary or secondary instance.

In one or more embodiments of the invention, the resource registration repository (326) specifies relationships between applications and their instances. For single instanced applications, the relationship specifies the only instance of the application. In contrast, for multi-instanced applications the relationship specifies only one instance of the multiple instances of the application. Accordingly, the resource registration repository (326) may specify unique relationships between each application and a single instance of that application.

In one or more embodiments of the invention, each of the backup/storage policies (322) utilizes the instance specified by a corresponding resource registration repository entry for backup generation purposes. In other words, a predetermined instance of an application is used for backup generation purposes whenever a backup for any of the instances is to be generated. In this manner, embodiments of the invention may enable backups to be generated even for multi-instanced applications.

In one or more embodiments of the invention, the listeners (328) are data structures that specify the multiple instances of each multi-instanced application. The listeners (328) may be used for assignment purposes to service client requests. In other words, the listeners (328) may include information that enables the resource manager (315) to intelligently select and instance of an application to service the client request. For example, each listener of the listeners (328) include an identifier of each instance of the application and specify the read and/or write permissions of each instance.

One more embodiments of the invention, the resource backup registration repository (330) specifies information regarding the backups and backup storage. Specifically, the resource backup registration repository (330) may specify all of the backups associated with each application, or other entities, and any relationships between each of the backups. For example, multiple backups may be required to restore an entity to predetermined state associated with one of the multiple backups. In such a scenario, some of the multiple backups may be incremental backups that only specify changes to an entity over a period of time rather than the state of the entity at a predetermined point in time. In that case, the incremental backups are only usable in combination with a backup that specifies the state of an entity at a predetermined time. To perform such a restoration, incremental backups are required that specify the changes to the entity between when the backup that specifies the state of entity at the predetermined time was generated and the point in time to which the entity is to be restored. The resource backup registration repository (330) may specify all of such relationships for each application, or other entity. By doing so, the resource backup registration repository (330) may enable entities of the system to identify the necessary backups and backup storage for storing entities to previous states using the backups.

The data structures stored in the persistent storage (320) may be stored in any format, include additional information, include less information, include different information, and/or be spanned across any number of devices without departing from the invention. Further, any of the data structures may be stored in other locations, other than the remote agent (300), and may be replicated as necessary throughout the system of FIG. 1 without departing from the invention.

Figure 3B:
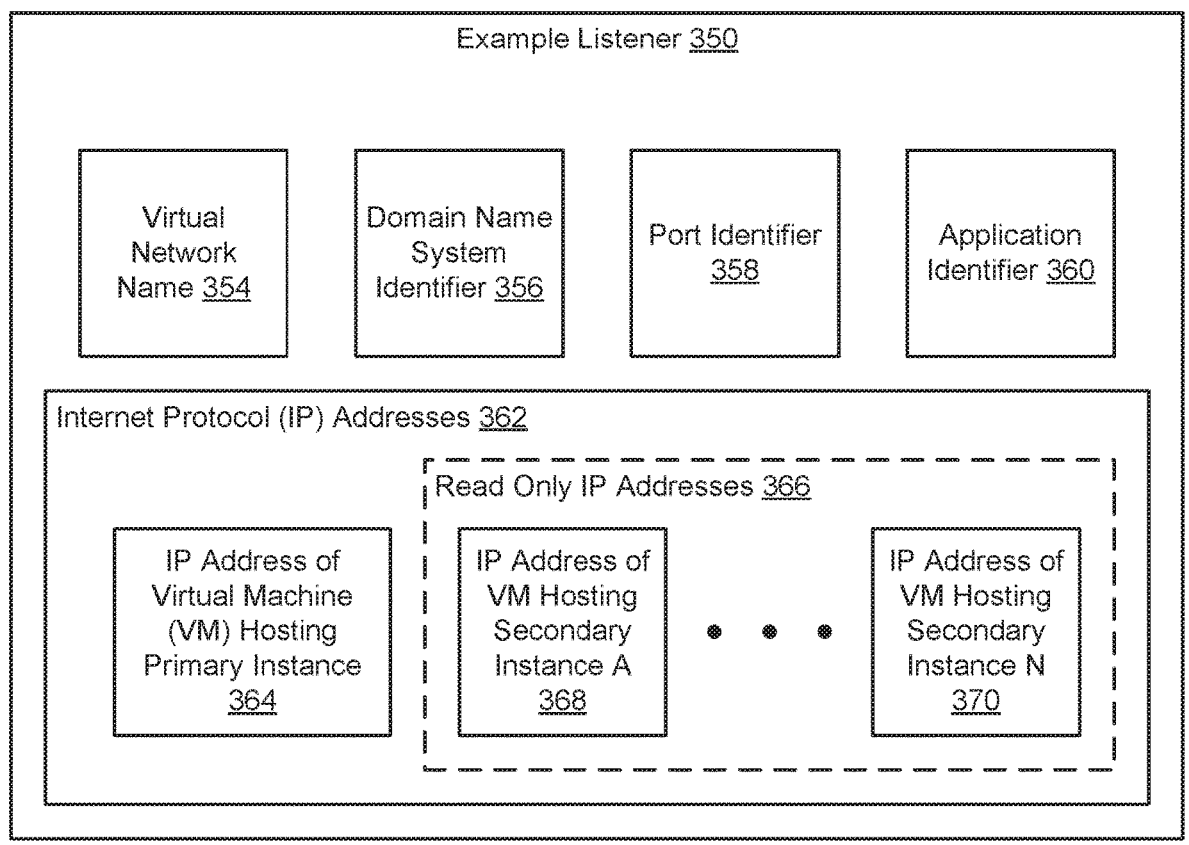
FIG. 3B shows a diagram of an example listener in accordance with one or more embodiments of the invention.

As discussed above, listeners may be used keep track of the instances of multi-instanced application. FIG. 3B shows a diagram of an example listener (350) in accordance with one or more embodiments of the invention. The example listener (350) may perform similar functions to that of the listener of FIG. 3A. To provide the functionality of the listener, the example listener (350) may include identification information within a network and identification information of each of the multiple instances within the network.

For example, the example listener (350) may include a virtual network name (354), domain name system identifier (356), port identifier (358), and/or an application identifier (360). The virtual network name (354) may specify an identifier of a virtual network to which clients may connect receiving services from the multiple instances of the application. The domain name system identifier (356) may specify the name of the listener. The port identifier (358) may specify a port designation for the listener. Application identifier (360) may specify the application associated with the listener.

The example listener (350) may further include a number of Internet protocol addresses (360). One of the Internet protocol addresses may be for a virtual machine hosting a primary instance (364) of the application. The remaining Internet protocol addresses may be read only Internet protocol addresses (366). The read only Internet protocol addresses (366) may specify any number of addresses (368, 370) that are each associated with a secondary instance of the multi-instanced application. For example, the any number of addresses (368, 370) need specify a virtual machine hosting a secondary instance of the multi-instanced application.

While illustrated in FIG. 3B as including specific information in a specific format, the example listener (350) may include additional, less, and/or different information stored in any format without departing from the invention. Further, the example listener (350) may be spanned across any number of devices and/or stored in different locations and/or replicated any number locations without departing from the invention.

As discussed above, components of the system of FIG. 1 may perform methods for generating backups of application and performing restorations of applications, in addition to other functions. FIGS. 4A-5 show methods in accordance with one or more embodiments of the invention that may be performed by components of the system of FIG. 1.

FIG. 4A shows a flowchart of a method in accordance with one or more embodiments of the invention. The method depicted in FIG. 4A may be used to generate a backup of an application in accordance with one or more embodiments of the invention. The method shown in FIG. 4A may be performed by, for example, a production host (e.g., 130, FIG. 1). Other components of the system illustrated in FIG. 1 may perform the method of FIG. 4A without departing from the invention.

In step 400, a backup generation request for an application is obtained.

In one or more embodiments of the invention the request is obtained by a production host. The request may be obtained directly or indirectly from requesting entity. The requesting entity may be, for example, a client or a remote agent.

In one or more embodiments of the invention, the backup generation request specifies an application hosted by a production host. The production host may be the same or different from the production host that obtained the backup generation request.

In one or more embodiments of the invention, the application is a multi-instanced application. An instance of the multi-instanced application may be executing on production host that obtained the backup generation request. The instance of the multi-instanced application may be a primary or a secondary instance.

In the step 402, a resource registration associated with the application is obtained.

In one or more embodiments of the invention, the resource registration is obtained by matching an identifier of the application to an entry of a resource registration repository. The matched entry of the resource registration repository may specify an identifier of an entity that is to generate the backup of the application. The identifier of the entity may be, for example, an identifier of a virtual machine hosting an instance of the application. The virtual machine may, or may not, be hosted by the production host that obtained the backup generation request.

In one or more embodiments of the invention, the resource registration specifies an association between the application and one of the instances of the application. In other words, in the scenario in which the application is a multi-instanced application.

In one or more embodiments of the invention, resource registration specifies an association between the application and the only instance of the application. In other words, the scenario in which the application is single-instance.

In step 404, it is determined whether the resource registration matches the entity that obtained the backup generation request. The determination may be made, for example, by comparing an identifier of the entity that obtained the backup generation request for an identifier specified by the resource registration.

If the resource registration does not match the entity, the method may proceed to step 406. If the resource registration does match the entity, the method may proceed to step 408.

In step 406, the backup generation request is forwarded to a second entity that matches the resource registration.

In one or more embodiments of the invention, the second entity host a second instance of the multi-instanced application. The second entity may be, for example, a second virtual machine.

In step 408, a backup generation for the application is performed to obtain continuity chain information associated with application.

In one or more embodiments of the invention, the backup generation may be performed by the entity that obtained the backup generation request in step 400. In other words, even if the entity that received the request in step 400 is not the entity specified by the resource registration associated with application specified by the request step 400 the entity that received the request in step 400 may perform the backup generation.

For example, if the entity that received the request in step 400 is not the entity specified by the resource registration associated with application specified in the backup generation request step 400 the entity that received request in step 400 may both forward the backup generation request to the second entity and may perform the backup generation request.

In step 410, a continuity chain associated with the application is modified using the continuity chain information obtained in step 408.

In one or more embodiments of the invention, the continuity chain represents the relationship between backups stored in backup storage associated with the application specified in the backup generation request step 400. For example, the continuity chain may represent the dependencies between backups stored in backup storage. As noted above various backups may be dependent upon other backups. Accordingly, the continuity chain may represent these relationships between the backups and backup storage.

In one or more embodiments of the invention the continuity chain associated with application is modified to reflect the addition of the backup generated in step 408. The continuity chain may be modified to reflect the addition of the backup generated in step 408 by adding new relationships to the continuity chain. For example, if the newly generated backup is an incremental backup the continuity chain may be modified to reflect that the newly generated backup depends on the previously generated backup.

In one or more embodiments of the invention, the continuity chain information may include an identifier of the previously generated backup. The continuity chain information may be modified to indicate that the now generated backup depends on the previously generated backup by including an association between the now generated backup and identifier of the previously generated backup. In contrast, if the now generated backup is an independent backup that does not depend on any other backup the continuity chain may be modified to reflect the independence of the newly generated backup.

Figure 4B:
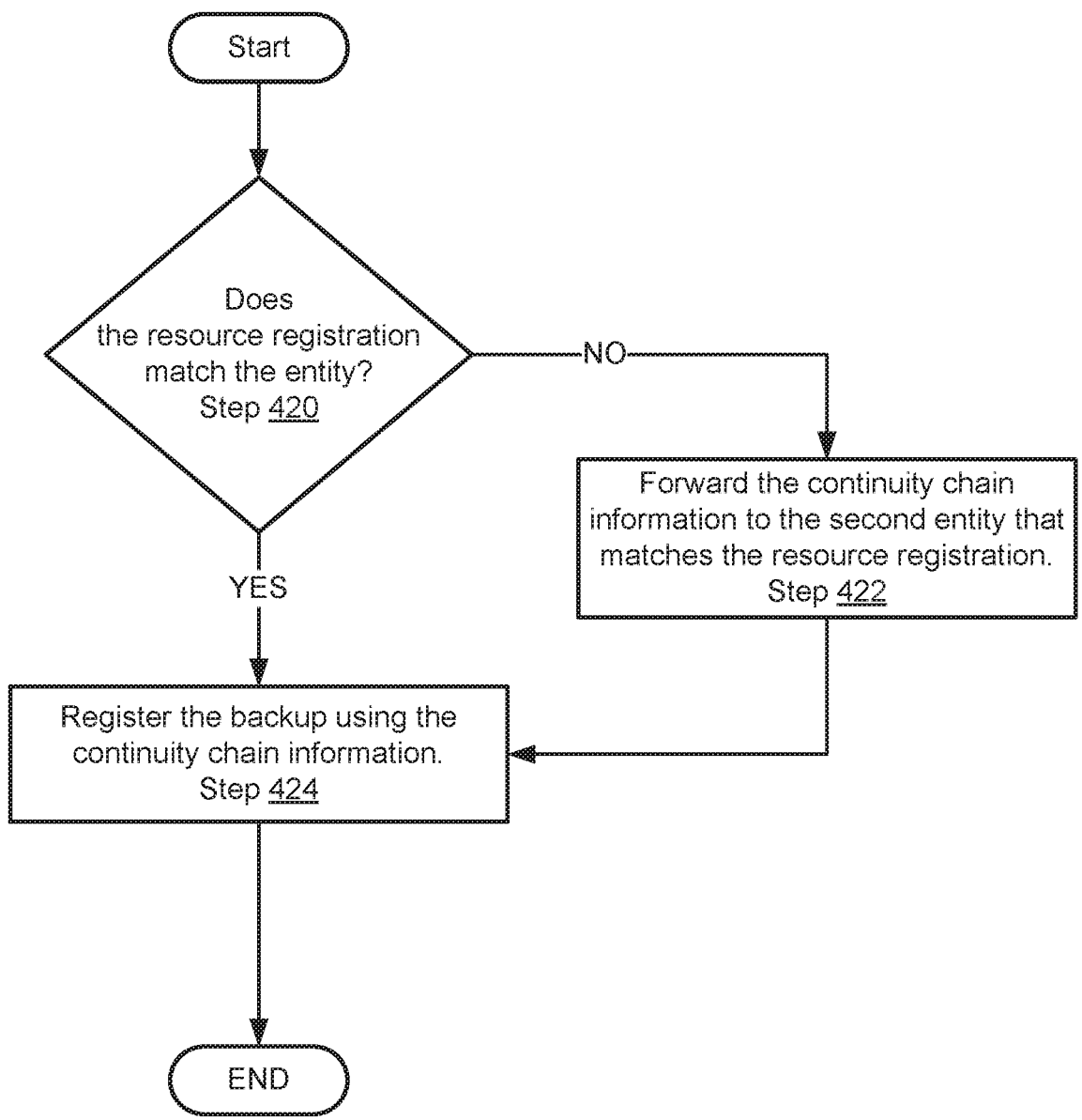
FIG. 4B shows a flowchart of a method of modifying a continuity chain in accordance with one or more embodiments of the invention.
Figure 5:
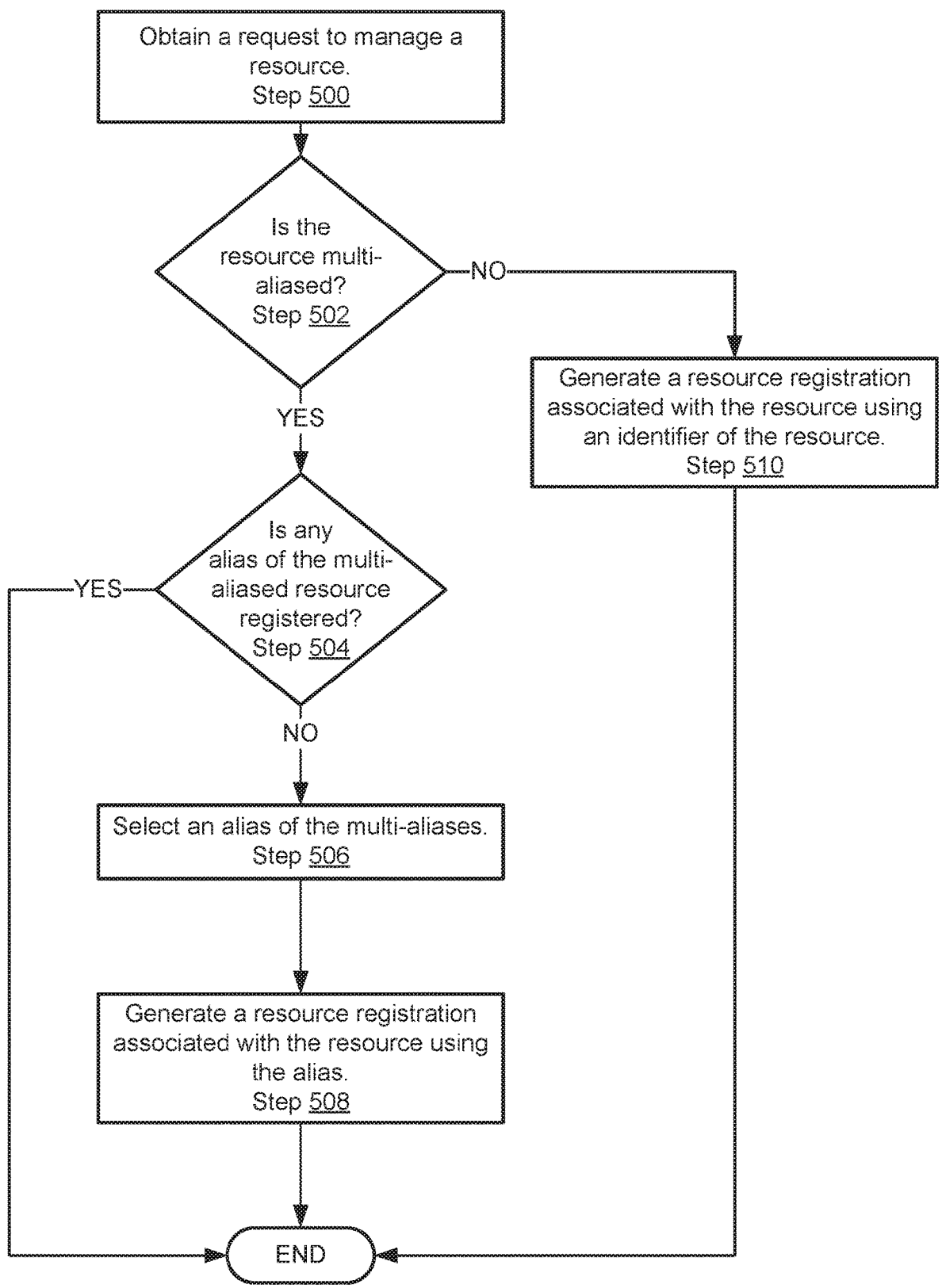
FIG. 5 shows a flowchart of a method of managing a resource in accordance with one or more embodiments of the invention.

In one or more embodiments of the invention, the continuity chain associated with application is modified via the method illustrated in FIG. 4B. The continuity chain associated with application may be modified via other methods without departing from the invention.

The method may end following step 410.

As noted above, the continuity chain information for each application may be modified as backups are generated. Doing so may ensure that each application, or other entity, may be efficiently restored her previous state using the backups specified by the corresponding continuity chain.

FIG. 4B shows a flowchart of a method in accordance with one or more embodiments of the invention. The method depicted in FIG. 4B may be used to modify a continuity chain in accordance with one or more embodiments of the invention. The method shown in FIG. 4B may be performed by, for example, a production host (e.g., 130, FIG. 1). Other components of the system illustrated in FIG. 1 may perform the method of FIG. 4B without departing from the invention.

In step 420, a determination is made about whether a resource registration matches the entity modifying the continuity chain.

In one more embodiments of the invention, the determination is made based on whether an identifier of the entity modifying the continuity chain matches and entity specified by the resource registration. In other words, it is determined whether the entity that generated the backup matches the entity specified by the resource registration.

If the entity that generated the backup matches the resource registration, the method proceeds to step 424. If the entity that generated the backup does not match the resource registration, the method proceeds to step 422.

In step 422, the continuity chain information is forwarded to the second entity that matches the resource registration.

For example, the community chain information may be forwarded to an entity specified by the resource registration. By doing so, the entity that was registered for backup generation purposes may be notified of the continuity chain information associated with application. Accordingly, one or more embodiments of the invention may ensure that resources registered for backup generation purposes are always provided with continuity information of backups associated with application regardless of whether resources registered for backup generation purposes actually generate the backups. By doing so, embodiments of the invention improve the reliability of backup generation by ensuring or otherwise improving the probability that entities registered for backup and restoration purposes are notified of all backups associated with application.

In step 424, the backup is registered using the continuity chain information.

In one or more embodiments of the invention, the backup is registered by the resource specified by the resource registration associated with application. In other words, even if resource specified by the resource registration does not generate the backup, the resource associated with the resource registration still registers the backup. The resource associated with the resource registration may also have access to the continuity chain information by receiving it from another entity as noted in step 422.

In one or more embodiments of the invention, the backup is registered by adding an entry to a resource backup registration repository. The backup may be registered by, for example, adding a new entry to the resource backup registration repository. The new entry may include an identifier the backup in the relationship between the backup and other backups associated with application. For example, if the backup depends on other backups, e.g., a secondary backup, the entry may include an identifier of a second backup upon which the backup depends. In one or more embodiments of the invention, the entry specifies a time associated with the backup.

The method may end all in step 424.

The methods illustrated in both of FIGS. 4A and 4B may enable a distributed system that provides backup services to automatically adjust for inaccuracies in the distributed system. By adjusting for inaccuracies in the distributed system, the system may insure or otherwise improve the reliability of backups generated but the distributed system, and accordingly, improve the reliability restoration of entities within the distributed system. For example, regardless of whether remote agent initiates a backup generation for a primary instance or a secondary instance of an application, the production hosts may automatically ensure that the backup for the application is generated and that the primary or secondary instance, which is registered with the system, is provided with the continuity chain information generated via the backup. By doing so, the system ensures or otherwise improves the reliability restoration using the generated backup.

As discussed above, remote agents may orchestrate the process of both backing up and restoring and entity. To provide such functionality, remote agents may perform the method illustrated in FIG. 5 below.

FIG. 5 shows a flowchart of a method in accordance with one or more embodiments of the invention. The method depicted in FIG. 5 may be used to register a resource in accordance with one or more embodiments of the invention. The method shown in FIG. 5 may be performed by, for example, a remote agent (e.g., 110, FIG. 1). Other components of the system illustrated in FIG. 1 may perform the method of FIG. 5 without departing from the invention.

In step 500, a request to manage a resource is obtained.

In one or more embodiments of the invention, the request is obtained from a newly added resource to the system. For example, when a new instance of an application is added to the system, and identifier of the virtual machine hosting the new instance of the application may be included in the request to manage the resource.

In step 502, it is determined whether the resource specified by the request is a multi-aliased resource.

In one or more embodiments of the invention, a determination may be made by comparing an identifier of the application to identifiers of applications already registered with the system. If the application is already registered with the system, the resource is determined as multi-aliased.

For example, an identifier of the application may be compared to identifiers of applications included in a resource identification information repository. The resource identification information repository may include identifiers of all resources that are managed by the remote agents.

If it is determined that the resource specified by the request is a multi-aliased resource the method may proceed to step 504. It is determined that the resource specified by the request is a single-aliased resource, the method may proceed to step 510.

In step 504, determined determination is made about whether the alias of the multi-alias resource is registered. If the alias of the multi-alias resource is already registered the method may end. If the alias of the multi-alias resource is not registered the method may proceed to step 506.

In step 506, an alias of the multi-aliases is selected.

In one or more embodiments of the invention, the alias of the multi-alias is selected arbitrarily. For example, alias of the multi-aliases please be selected randomly or for another purpose. The alias of the multi-aliases may be selected via other means without departing from the invention.

In step 508, resource registration associated with the resources generated using alias selected in step 506.

In one or more embodiments of the invention, the resource registration is generated based on the alias selected in step 506. For example, the new entry to the resource registration repository may be generated. The new entry may include the alias selected in step 506.

Returning to step 502, the method may proceed to step 510 following step 502.

In step 510, resource registration associated with the resource is generated using identifier of the resource.

In one or embodiments of the invention, the resource registration is generated by adding a new entry to the resource registration repository. The new entry may include an identifier of the single-aliased resource.

The method may end following step 500.

In one or more embodiments of the invention, the method illustrated in FIG. 5 may provide registrations for each application of the system of FIG. 1. By doing so, embodiments of the invention may not rely on listeners for determining which instances of applications to use for backup generation purposes. Embodiments of the invention may improve the reliability backup generation by ensuring that the same instance of an application is used for backup generation purposes. Further, embodiments of the invention may selectively allow for a predetermined instance of an application to be used for backup generation purposes. The predetermined instance may be selected to improve the reliability of backup generation when compared with prior systems that provide backup services applications.

To further clarify embodiments of the invention, a non-limiting example is provided in FIGS. 6A-6E.

Example

Figure 6A:
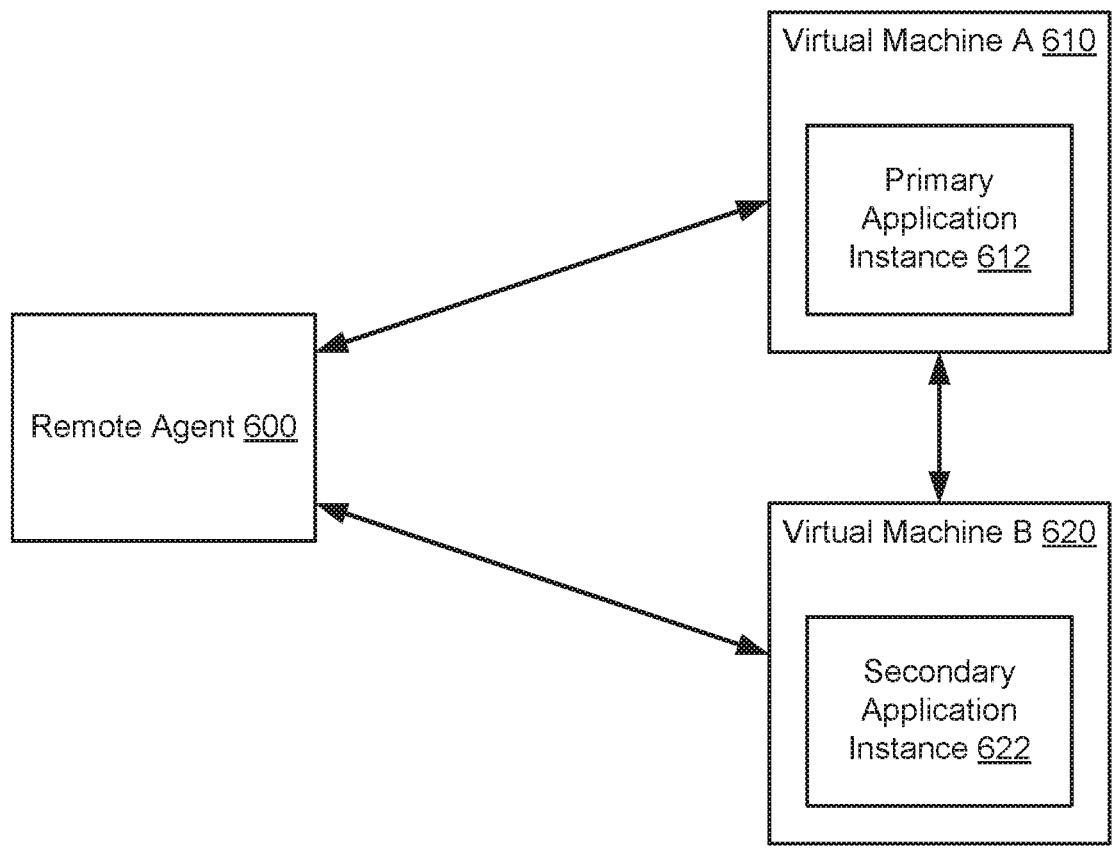
FIG. 6A shows a diagram of an example system at a first point in time.

Consider a scenario as illustrate din FIG. 6A in which a remote agent (600) provides backup services to two virtual machines (610, 620). Virtual machine A (610) may host a primary application instance (612) and virtual machine B (620) may host a secondary application instance (622).

Figure 6B:
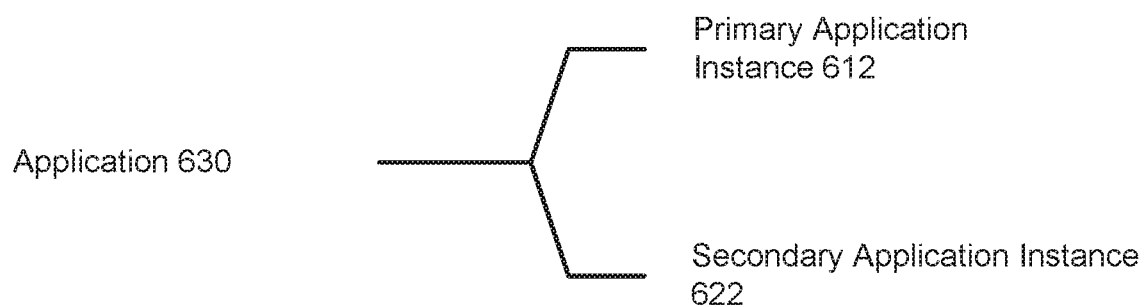
FIG. 6B shows a relationship diagram of the example system of FIG. 6A.

In such a scenario, an application (630) may be associated with both instances as illustrated in FIG. 6B. For example, the application (630) may be associated with the primary application instance (612) and the secondary application instance (622). The primary application instance (612) may be a database that has both read and write access privileges while the secondary application instance (622) may only have read privileges.

Figure 6C:
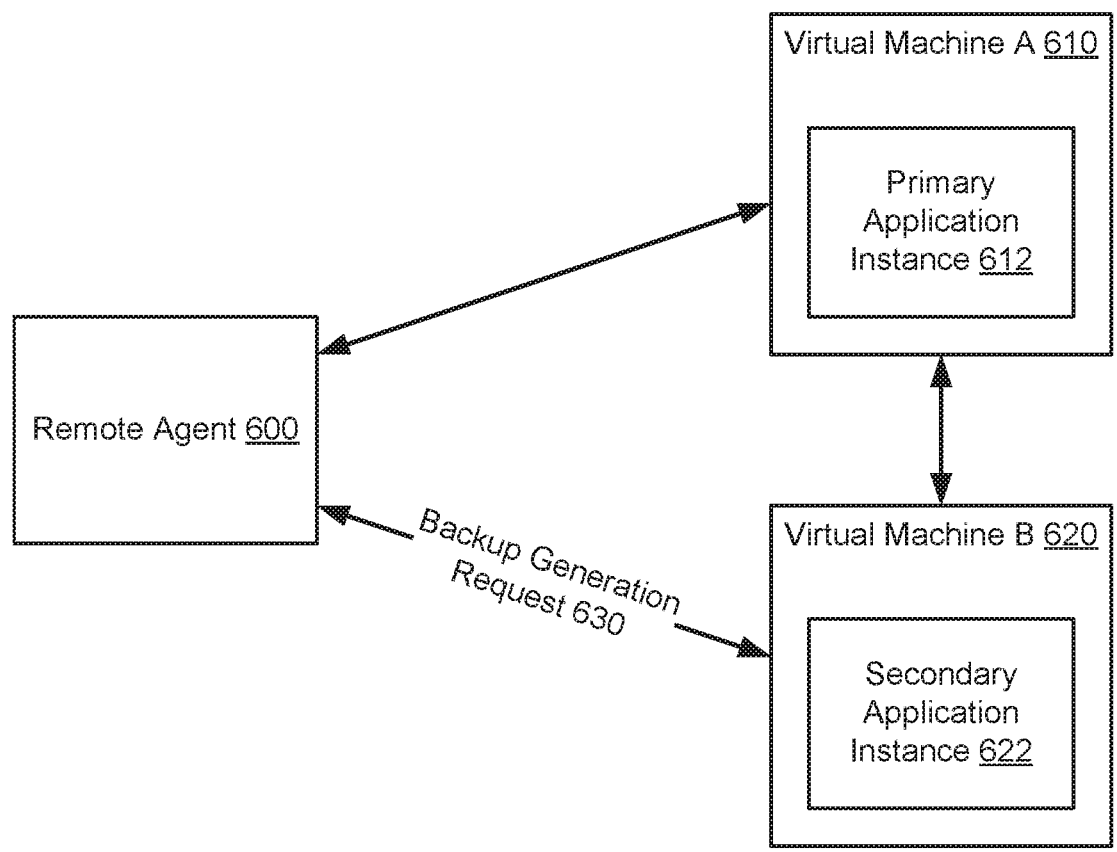
FIG. 6C shows a diagram of the example system of FIG. 6A at a second point in time.

At a point in time as illustrated in FIG. 6C, a request for a backup generation of the secondary application instance (622) may be received. In response to receiving the backup generation request, the remote agent (600) makes send the backup generation request (630) to the virtual machine B (620). However, the primary application instance (612) may be registered.

Figure 6D:
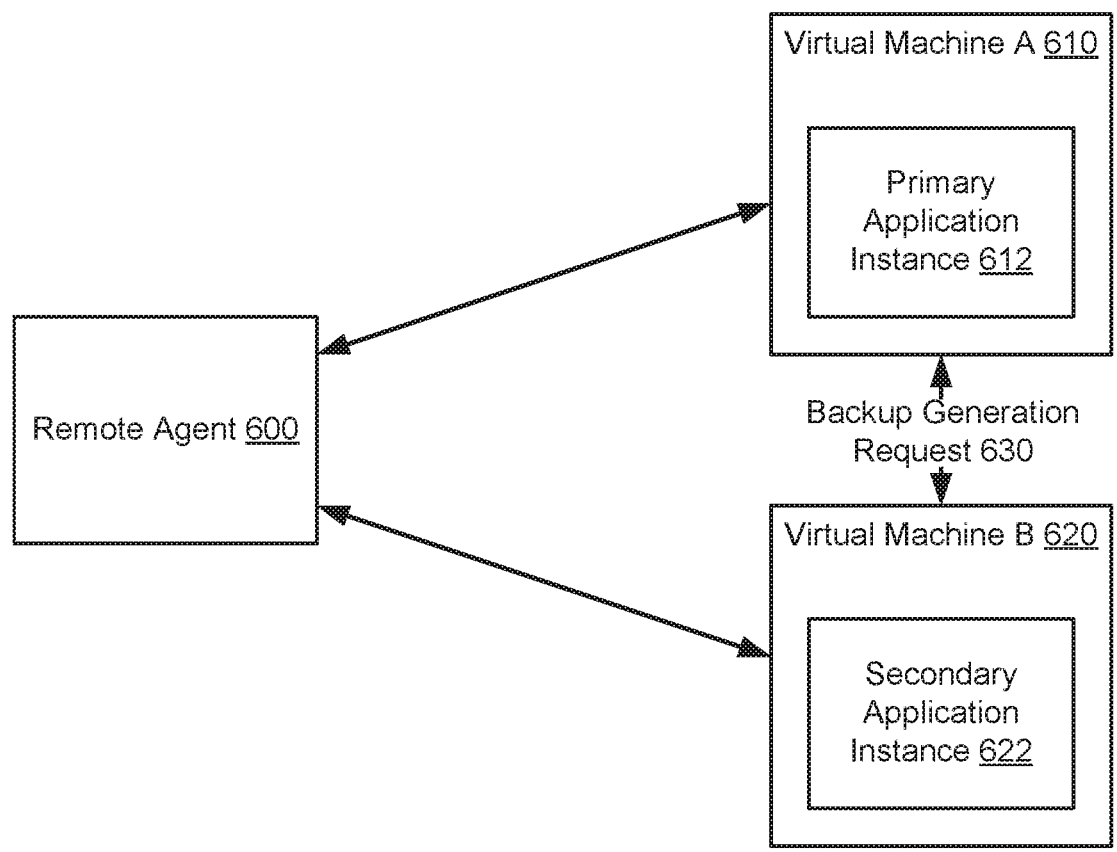
FIG. 6D shows a diagram of the example system of FIG. 6A at a third point in time.

In such a scenario, virtual machine B (620) forwards the backup generation request (630) to virtual machine A (610) as illustrated in FIG. 6D. After forwarding the backup generation request (630), virtual machine B (620) may generate a backup of the secondary application instance (622). By doing so, a backup of one of the application instances associated with application may be generated without requiring the primary application instance (612) to be used to generate the backup.

Figure 6E:
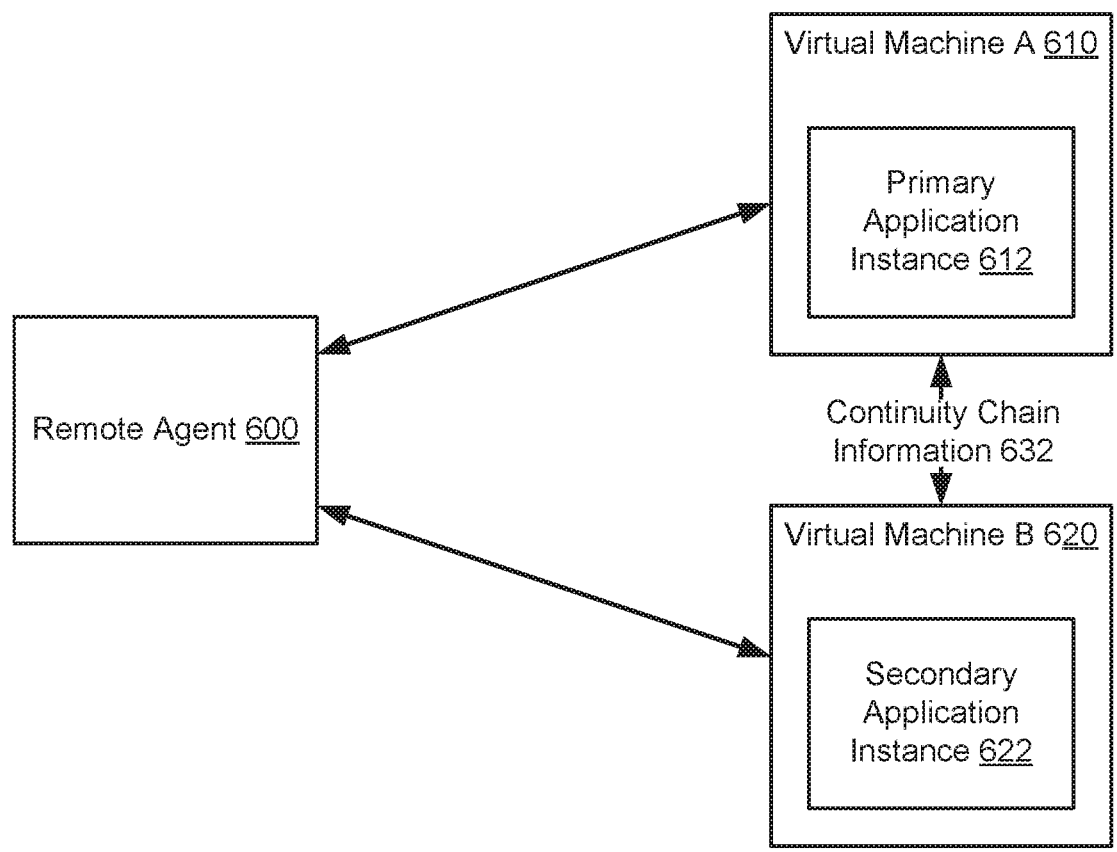
FIG. 6E shows a diagram of the example system of FIG. 6A at a fourth point in time.

After generating the backup, virtual machine B (600) forwards continuity chain information (632) for the generated backup to virtual machine A (610) as illustrated in FIG. 6E. By doing so, the entity registered with application for backup and regeneration purposes is provided with continuity chain information for the application even in a scenario in which the registered entity did not generate a backup.

End of Example

Figure 7:
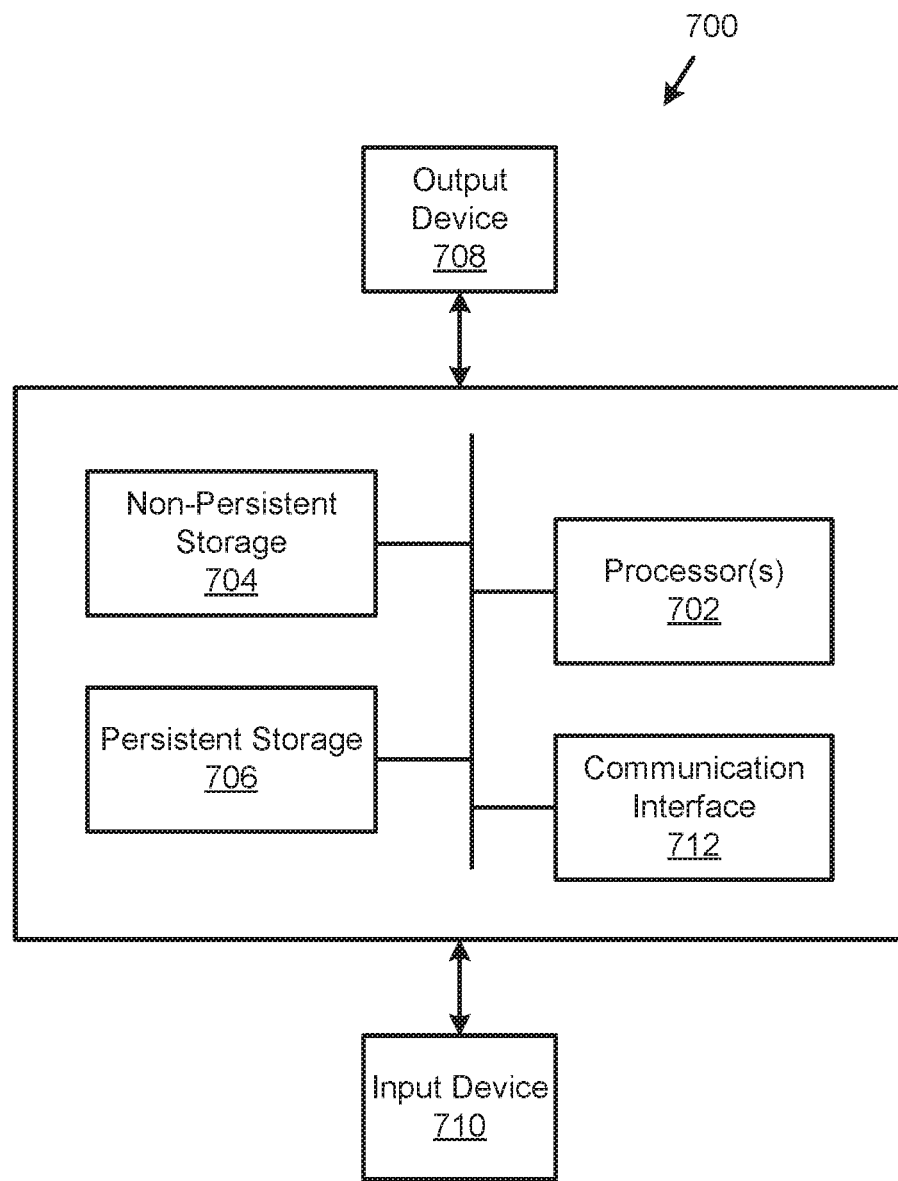
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention, may improve the reliability of computing device in distributed system. Specifically, embodiments of the invention may enable backups of multi-instance applications to be generated while minimizing the competition all resource cost of generated such backups. For example, embodiments of the invention may enable backups to be generated using secondary instances of application rather than primary instances of an application. By doing so, embodiments of the invention may improve allocation of computing resources for backup generation purposes by limiting the use of primary instances that encumber both read and write access privileges.

Further, one or more embodiments of the invention may improve the reliability of distributive system by automatically correcting for errors incumbent in operation of a component of the distributed system. For example, embodiments of the invention may automatically reallocate use of computing resources of production hosts for backup generation purposes without obtaining authorization of remote agents that otherwise orchestrate the processor backup generation. By doing so, embodiments of the invention may improve the efficiency of a distributed system by reducing the quantity of communications within the distributed system, e.g., acks/nacks. For modern systems that host hundreds to thousands of applications, this characteristic may be substantial improvement when compared to contemporary systems that are unable to cope with the number of communications required for control of the distributed system by centralized entity such as a remote agent.

Thus, embodiments of the invention may improve the field of distributed systems by improving the reliability of such systems. Because the reliability of such systems is dependent on both individual entities within the system and the interactions between the elements of such systems, embodiments of the invention improve such systems by reducing the quantity of inter-device communications that would otherwise overwhelm the system.

Further, embodiments of the invention improve the reliability of the system by reducing the cognitive burden on users of the system. In contrast to contemporary systems that rely on users selecting the application instance from which they obtain services from, embodiments of the invention automatically perform assignments without user intervention. By doing so, users are free to utilize services the system without placing the cognitive burden on application instance selection on the user. In modern systems such burdens are extremely large because of the number of instances of applications in modern systems.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host for hosting a multi-instanced application, comprising:
   a persistent storage that stores:
      a resource registration associated with a plurality of instances of the multi-instanced application, and
      a resource backup registration associated with backups, of the multi-instanced application, that are stored in backup storage;
   a resource manager programmed to:
      obtain a backup generation request for the multi-instanced application;
      in response to obtaining the backup generation request:
         make a first determination that the resource registration does not match the production host;
         in response to the first determination:
            forward the backup generation request to an entity that matches the resource registration;
            perform a backup generation for the multi-instanced application to obtain continuity chain information associated with the multi-instanced application, wherein the continuity chain information specifies a relationship between a backup generated by the backup generation and a previously generated backup associated with the multi-instanced application; and
            modify a continuity chain associated with the multi-instanced application based on the continuity chain information to update the resource backup registration.

2. The production host of claim 1, wherein modifying the continuity chain associated with the multi-instanced application based on the continuity chain information to update the resource backup registration comprises:
   in response to the first determination:
      forwarding the continuity chain information to the entity; and
      registering a backup generated by performing the backup generation using the continuity chain information to update the resource backup registration.

3. The production host of claim 1, wherein the plurality of instances of the multi-instanced application comprises:
   a primary instance for which read and write permission is enabled; and
   at least one secondary instance for which write permission is disabled.

4. The production host of claim 3, wherein the production host only hosts one of the primary instance and the at least one secondary instance.

5. The production host of claim 1, wherein making the first determination that the resource registration does not match the production host comprises:
   identifying a type of an instance of the multi-instanced application hosted by the production host; and
   comparing the type of the instance of the multi-instanced application to a second instance type specified by the resource registration.

6. The production host of claim 5, wherein the second instance type in the resource registration is different from the type of the instance of the multi-instanced application.

7. The production host of claim 5, wherein the type of the instance of the multi-instanced application specifies whether write access is enabled for the multi-instanced application hosted by the production host.

8. The production host of claim 1, wherein the resource manager is further programmed to:
   receive a second backup generation request for a second multi-instanced application;
   receive second continuity chain information associated with the second multi-instanced application after receiving the second backup generation request; and
   modify a second continuity chain associated with the second multi-instanced application based on the second continuity chain information to further update the resource backup registration.

9. The production host of claim 8, wherein the production host does not generate a backup for the second multi-instanced application.

10. The production host of claim 8, wherein modifying the second continuity chain associates a backup, of the second multi-instanced application, that is generated by a second production host with the second multi-instanced application, wherein the backup is stored in backup storage.

11. A method for managing a multi-instanced application, comprising:
   obtaining, by a production host, a backup generation request for the multi-instanced application;
   in response to obtaining the backup generation request:
      making a first determination that a resource registration does not match the production host, wherein the resource registration is associated with a plurality of instances of the multi-instanced application;
      in response to the first determination:
         forwarding the backup generation request to an entity that matches the resource registration;
         performing a backup generation for the multi-instanced application to obtain continuity chain information associated with the multi-instanced application, wherein the continuity chain information specifies a relationship between a backup generated by the backup generation and a previously generated backup associated with the multi-instanced application; and
         modifying a continuity chain associated with the multi-instanced application based on the continuity chain information to update a resource backup registration, wherein the resource backup registration is associated with backups, of the multi-instance application, that are stored in backup storage.

12. The method of claim 11, wherein modifying the continuity chain associated with the multi-instanced application based on the continuity chain information to update the resource backup registration comprises:
based on the first determination:
forwarding the continuity chain information to the entity; and
registering a backup generated by performing the backup generation using the continuity chain information to update the resource backup registration.

13. The method of claim 11, further comprising:
receiving a second backup generation request for a second multi-instanced application;
receiving second continuity chain information associated with the second multi-instanced application after receiving the second backup generation request; and
modifying a second continuity chain associated with the second multi-instanced application based on the second continuity chain information to further update the resource backup registration.

14. The method of claim 13, wherein modifying the second continuity chain associates a backup, of the second multi-instanced application, that is generated by a second production host with the second multi-instanced application, wherein the backup is stored in backup storage.

15. The method of claim 11, wherein the plurality of instances of the multi-instanced application comprises:
a primary instance for which read and write permission is enabled; and
at least one secondary instance for which write permission is disabled.

16. A non-transitory computer readable medium comprising computer readable program code, which when executed by a computer processor enables the computer processor to perform a method for managing a multi-instanced application, the method comprising:
obtaining, by a production host, a backup generation request for the multi-instanced application;
in response to obtaining the backup generation request:
making a first determination that a resource registration does not match the production host, wherein the resource registration is associated with a plurality of instances of the multi-instanced application;
in response to the first determination:
forwarding the backup generation request to an entity that matches the resource registration;
performing a backup generation for the multi-instanced application to obtain continuity chain information associated with the multi-instanced application, wherein the continuity chain information specifies a relationship between a backup generated by the backup generation and a previously generated backup associated with the multi-instanced application; and
modifying a continuity chain associated with the multi-instanced application based on the continuity chain information to update a resource backup registration, wherein the resource backup registration is associated with backups, of the multi-instance application, that are stored in backup storage.

17. The non-transitory computer readable medium of claim 16, wherein modifying the continuity chain associated with the multi-instanced application based on the continuity chain information to update the resource backup registration comprises:
in response to the first determination:
forwarding the continuity chain information to the entity; and
registering a backup generated by performing the backup generation using the continuity chain information to update the resource backup registration.

18. The non-transitory computer readable medium of claim 16, wherein the method further comprises:
receiving a second backup generation request for a second multi-instanced application;
receiving second continuity chain information associated with the second multi-instanced application after receiving the second backup generation request; and
modifying a second continuity chain associated with the second multi-instanced application based on the second continuity chain information to further update the resource backup registration.

19. The non-transitory computer readable medium of claim 18, wherein modifying the second continuity chain associates a backup, of the second multi-instanced application, that is generated by a second production host with the second multi-instanced application, wherein the backup is stored in backup storage.

20. The non-transitory computer readable medium of claim 16, wherein the plurality of instances of the multi-instanced application comprises:
a primary instance for which read and write permission is enabled; and
at least one secondary instance for which write permission is disabled.

* * * * *